Aug. 14, 1923.

T. J. HADDEN

AXLE TRUING MACHINE

Filed July 23, 1921

Inventor
T. J. Hadden.

By Lacey & Lacey, Attorneys

Aug. 14, 1923.

T. J. HADDEN 1,464,760

AXLE TRUING MACHINE

Filed July 23, 1921

Inventor

T. J. Hadden.

By Lacey & Lacey, Attorneys

Aug. 14, 1923.

T. J. HADDEN

AXLE TRUING MACHINE

Filed July 23, 1921

Inventor

T. J. Hadden.

By Lacey & Lacey, Attorneys

Aug. 14, 1923.

T. J. HADDEN 1,464,760

AXLE TRUING MACHINE

Filed July 23, 1921

Inventor
T. J. Hadden.

By Lacey Lacey, Attorneys

Patented Aug. 14, 1923.

1,464,760

UNITED STATES PATENT OFFICE.

THOMAS J. HADDEN, OF MOUNT CARMEL, ILLINOIS, ASSIGNOR OF ONE-HALF TO CLARENCE HURD, OF MOUNT CARMEL, ILLINOIS.

AXLE-TRUING MACHINE.

Application filed July 23, 1921. Serial No. 487,016.

*To all whom it may concern:*

Be it known that I, THOMAS J. HADDEN, a citizen of the United States, residing at Mount Carmel, in the county of Wabash and State of Illinois, have invented certain new and useful Improvements in Axle-Truing Machines, of which the following is a specification.

This invention relates to machines for truing car journals without removing the wheels and has for its object the provision of an apparatus which may be easily and quickly brought into position to operate upon the journal and accurately centered therewith. A further object of the invention is to provide means whereby the cutter or other tool may be easily and quickly adjusted to clear the flange of the journal and brought into position to operate upon the journal, and a still further object of the invention is to provide simple and compact mechanism whereby the tool will be caused to travel longitudinally of the journal while acting thereon so that all parts of the journal will be accurately finished. Another object of the invention is to provide simple means whereby the tool may be easily secured in working position upon its carrier, and other objects of the invention will appear incidentally in the course of the following description. The invention resides in certain novel features which will be particularly pointed out in the claims following the description.

In the accompanying drawings which illustrate one embodiment of the invention,—

Fig. 8 is a detail of the means for rolling and polishing the trued journal.

Figure 1:
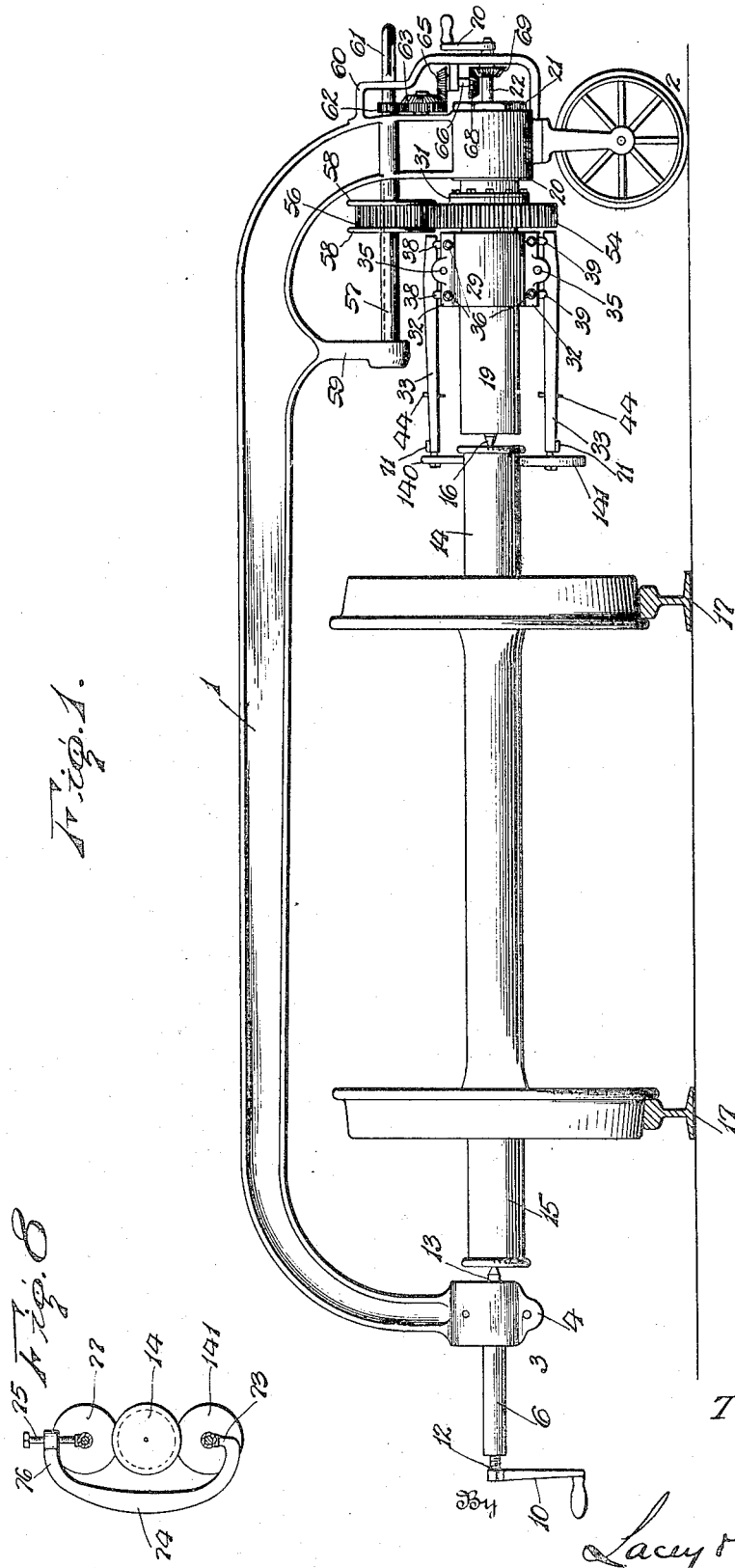
Figure 1 is a side elevation of the apparatus in position to act upon a car journal.
Figure 6:
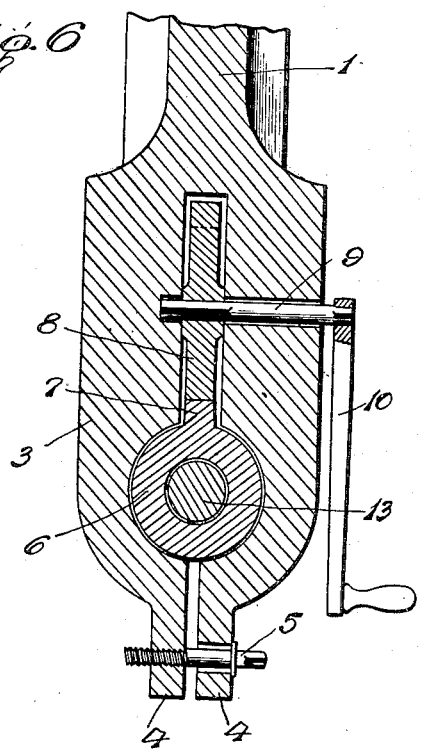
Fig. 6 is a detail section on the line 6—6 of Fig. 2.
Figure 7:
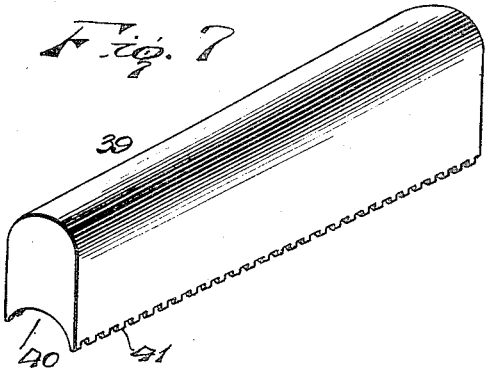
Fig. 7 is a detail perspective view of one of the wedges for adjusting the tool-carrying arm.

In carrying out my invention, I employ a frame consisting of an arched bar 1 adapted to extend over the axle and the wheels thereon, as shown in Fig. 1, and having one end supported upon caster wheels 2. The opposite end of the frame is formed into a split sleeve 3 having depending lugs or ears 4 through which a clamping screw or bolt 5 is inserted. This clamping screw or bolt, as shown most clearly in Fig. 6, is loosely fitted through one of the lugs 4 and has threaded engagement with the opposite lug whereby, when the bolt or screw is rotated in one direction, the lugs will be caused to approach each other and when the screw or bolt is rotated in the opposite direction they will be permitted to spread apart. Extending longitudinally through this split sleeve 3 is a hollow centering shaft or barrel 6 provided upon its upper portion, at its inner end, with a rack 7 with which meshes a pinion 8 housed within the split sleeve above the rack, as clearly shown. This pinion 8 is carried by a transverse spindle 9 having one end extending through the side of the sleeve and constructed with an angular terminal to be engaged by an operating handle 10. At its outer end the barrel 6 has its bore internally threaded, as shown at 11, to be engaged by the exteriorly threaded portion 12 of a centering pin 13 which extends longitudinally through the barrel and is adapted at its inner end to engage the center of the adjacent car journal. The outer extremity of the pin 13 is angular in cross section to be engaged by the operating handle 10 when the centering pin is to be forced into supporting engagement with the journal. It will be readily understood from the drawings that the machine is arranged to operate upon the journal 14 at that end of the frame remote from the centering pin 13 and the journal 15 adjacent the centering pin 13 is utilized during the truing operation as a partial support for the frame. The working end of the machine carries a centering pin 16 which is engaged in the center upon the journal to be trued, after which the supporting end of the frame is brought down into position beyond but adjacent the journal 15 and the handle 10 is engaged upon the end of the spindle 9 and manipulated to cause the barrel 6 to approach the said journal, the centering pin 13 being thus brought into engagement with the center on said journal. The handle 10 is then engaged upon the adjusting screw or bolt 5 and manipulated to clamp the sleeve around the barrel 6 so that movement of the barrel will be prevented, after which the handle is engaged upon the outer extremity of the centering pin and turned so that the pin will be forced into binding engagement with the journal and the machine thus brought into accurate axial alinement with the journal which is to be trimmed. It will also be noted that the operator assumes a position adjacent that end of the machine carrying the tools and which is disposed adjacent the journal 14, while a helper adjusts the supporting end of the frame into proper relation to and in engagement with the remote journal 15. After one journal has been treated, the machine may be released by reverse manipulation of the centering pins and then shifted parallel with the track 17 so as to operate upon another journal at the same side of the track 17.

Figure 2:
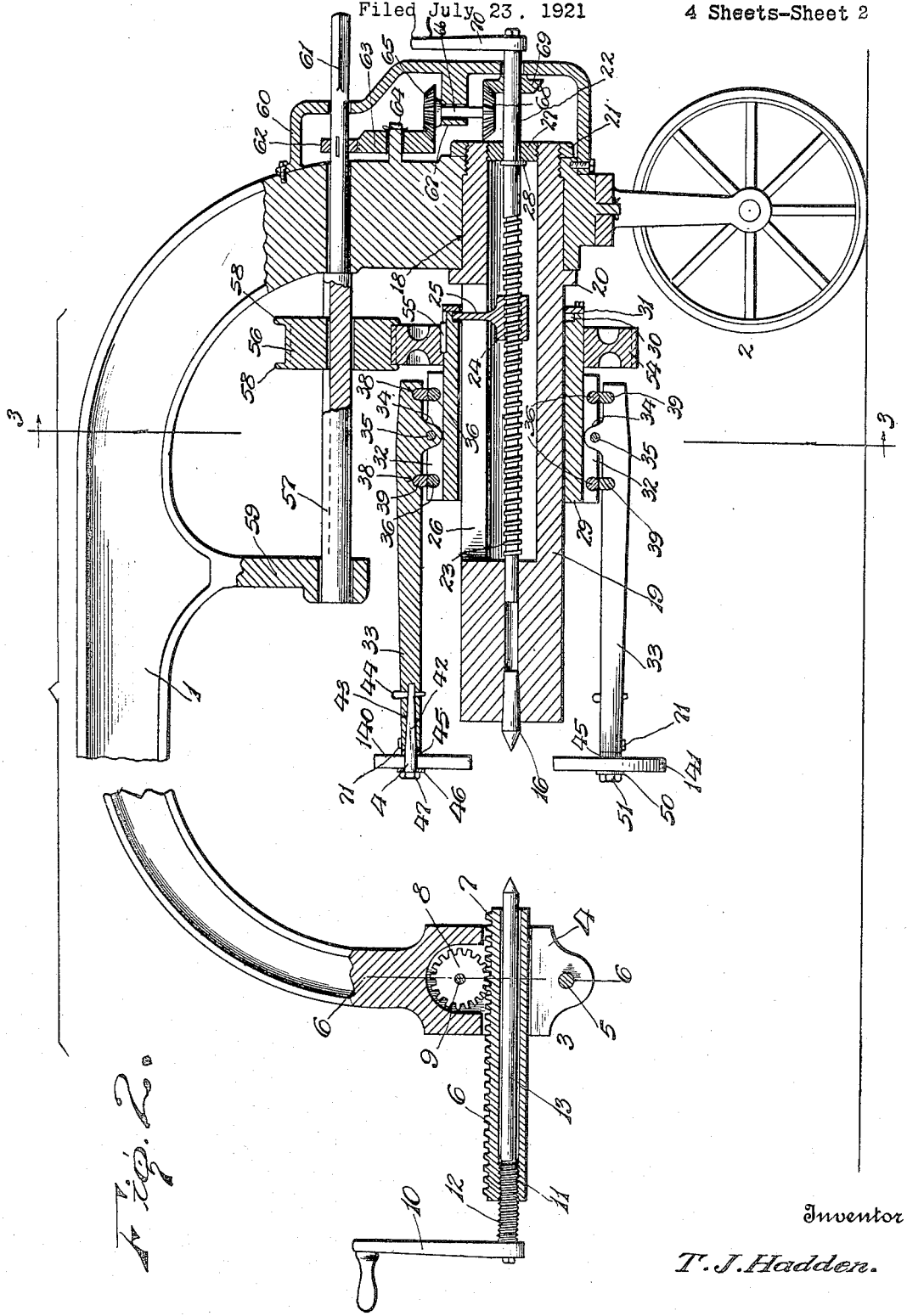
Fig. 2 is an enlarged longitudinal section of the machine.
Figure 3:
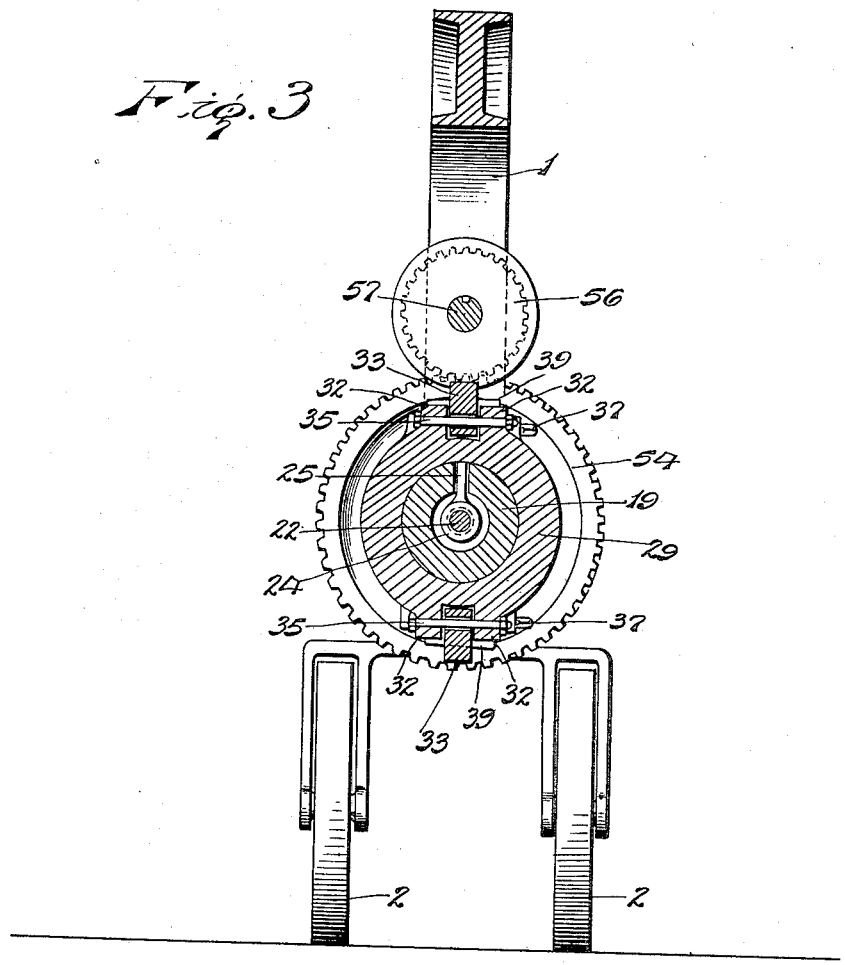
Fig. 3 is a transverse section on the line 3—3 of Fig. 2.
Figure 4:
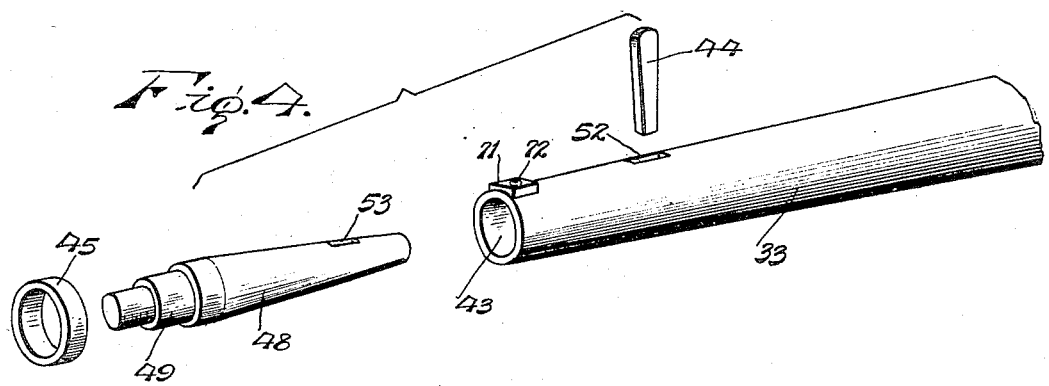
Fig. 4 is a detail perspective view of the means for securing the tool in place.
Figure 5:
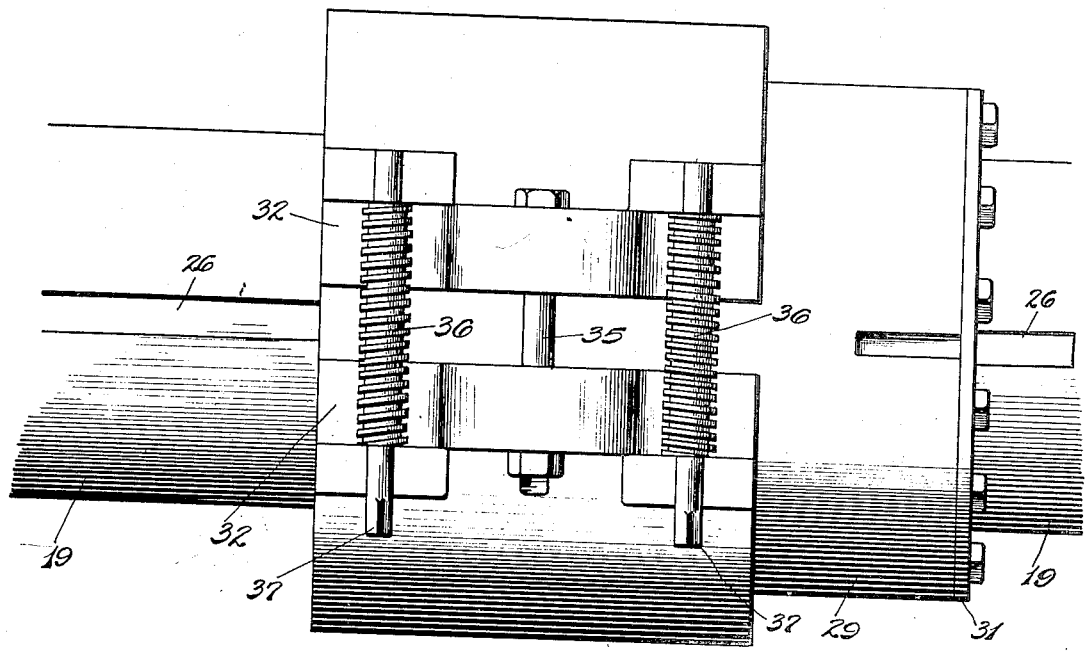
Fig. 5 is an enlarged plan view of the support for the tool-carrying arm.

As shown most clearly in Fig. 2, the casters 2 are swivelly connected with the extremity of the frame bar at the working end of the same and immediately above said extremity an opening 18 is formed through the said bar to receive the outer end of a tubular body 19, the centering pin 16 being disposed at the inner end of said body at the center of the same, as shown. This tubular cylindrical body 19 is provided with an annular flange 20 which is adapted to bear against the inner face of the frame bar and upon the outer extremity of the said body is fitted a nut or ring 21 which is turned home against the outer face of the frame bar so that the body will be firmly secured in the frame. Disposed longitudinally within the cylindrical body 19 and at the axis of the same is a rod 22 which has smooth end portions but within the bore of the body is constructed with coarse threads 23 and a nut or threaded sleeve 24 is mounted upon this threaded portion of the rod 22 and constructed with a finger 25 projecting through a longitudinal slot 26 in the body, as shown clearly in Fig. 2. Upon reference to said Fig. 2, it will be noted that the bore of the cylinder or cylindrical body 19 is open at its rear or outer end and the rod 22 extends through said end and is supported by a nut 27 threaded into the end of the bore and bearing against an abutment 28 formed on the rod so that the rod will be swiveled in the cylinder but will be held against endwise movement in one direction, endwise movement in the opposite direction being prevented by the inner end of the threads 23 and by gearing upon the outer end of the rod which will be hereinafter described. Loosely fitted upon the cylinder at the inner side of the frame bar is a sleeve or traveler 29 provided at its outer end with an annular recess 30 receiving the finger 25, and upon the outer end of the said traveler I secure a cap plate 31 which extends over the said recess 30 and thereby retains the finger 25 in engagement therewith. It will thus be seen that the traveler may rotate about the cylinder and also slide longitudinally thereupon and longitudinal movement will be imparted to the traveler by the finger 25 which must follow the endwise movement of the nut 24 but is prevented from rotating by the sides of the slot 26. The traveler 29 is provided with spaced ears or ribs 32 at diametrically opposite points and the tool-carrying arms 33 are provided near their outer ends with lugs 34 adapted to fit between the said ribs or ears and be attached thereto by pivot pins 35 inserted through registering openings in the said lugs and in the ribs 32. The ribs 32 also serve as bearings for the smooth ends of screws 36 provided at the opposite sides of the pivots and equipped at one side of the machine with angular terminals 37 which may be engaged by a convenient turning handle. The threads upon these screws are reversely arranged, as shown most clearly in Fig. 5, and the terminals 37 of all the screws are disposed at the same side of the machine so that the operator will not be under the necessity of shifting from one side of the machine to the other side when adjusting the tool-carrying arms. The arrangement also removes the uncertainty as to the direction in which the screws must be turned to attain a desired result inasmuch as both the screws will be turned in one direction to bring the tool-carrying arm into operative position and turned in the opposite direction to bring the tool-carrying arm into its inoperative position. The tool-carrying arm is provided in its edge or side presented to the traveler with transverse grooves or recesses 38 in which are engaged the adjusting slides or wedges 39, the said wedges having their inner edges concaved transversely, as shown at 40, and provided with transverse threads 41 which are adapted to engage the threads of the adjusting screws 36 whereby rotation of the screws will effect endwise movement of the said slides or wedges. Obviously, if these wedges be caused to move toward one side of the machine, the tool-carrying arm 33 engaged thereby will be caused to rock upon its pivot 35 so that the inner end of the same will move radially outward from the cylinder 19 and if the wedges be caused to move toward the opposite side of the machine, a reverse movement will be imparted to the tool-carrying arm. It will also be understood that the wedges engaging one tool-carrying arm are arranged reversely to each other, that is to say, the smaller end of one wedge is arranged at the same side of the apparatus as the larger end of the cooperating wedge inasmuch as the tendency of the wedges must be to move the engaged portions of the arm in opposite directions as the wedges are disposed at opposite side of the pivot of the arm.

For the purposes of illustration, I have shown two tool-carrying arms, but it is to be understood that a greater number of arms may be employed if so desired, although ordinarily two arms will be found sufficient. One of the arms is shown as carrying a cutter 140, while the other arm carries a roller 141. The cutter 140 is inserted through a longitudinal slot in the stem or shank 42 which is tapered to engage a tapered socket 43 in the end of the arm 33. The stem is provided near its smaller extremity with a longitudinally disposed slot and a wedge-shaped key 44 is inserted through registering openings in the arm and the said slot so as to draw the stem firmly into the socket and thereby support the tool so that it will be held firmly to its work. A spacing collar 45 is preferably fitted upon the stem between the cutter and the end of the arm 33 and the cutter may be further secured against said spacing collar by a washer 46 and nut 47 mounted upon the outer extremity of the stem. The roller 141 is mounted upon the carrying arm 33 in a similar manner, but the stem 48 carrying the roller need not be provided with a longitudinal slot near its outer end, a smooth portion 49 of circular cross section being utilized as a bearing for the roller and the roller being retained thereon by a washer 50 and a nut 51 similar to the washer 46 and nut 47. A spacing collar or ring 45 is, however, employed between the end of the arm 33 and the roller and a key 44 is inserted through registering openings 52 in the arm and the slot 53 in the stem 48. This means for mounting the tool upon the arm 33 will effectually retain the tool in position while it is at work but permits its ready detachment when a new tool is to be substituted or the tool which has been in use is to be sharpened or otherwise repaired.

Upon the traveler 29 at the outer end thereof, I secure a gear wheel 54, preferably by a key 55, and this gear 54 is in mesh with a gear 56 upon the driving shaft 57, the gear 56 being provided with circumferential flanges 58 engaging the radial faces of the gear 54 so that, when the gear 54 moves longitudinally with the traveler, the gear 56 will be likewise moved. The driving gear 56 is mounted upon the driving shaft 57 so that, while it is constrained to rotate with said shaft, it is free to travel longitudinally of the same and the said shaft is journaled in the depending end of the frame bar and in a bearing hanger 59 formed on the said frame bar. The shaft 57 extends outwardly beyond the frame bar and through a gear casing 60 which is secured upon the outer side of said bar. I have shown the outer end 61 of the driving shaft as of angular cross section so that it may be engaged by a crank or other turning tool, but it is to be understood that power may be applied to the shaft from any convenient source such as an electric motor, a compressed air engine, or any other prime motor. Within the gear casing 60, a spur pinion 62 is secured upon the driving shaft and said pinion meshes with a combined spur and beveled gear 63 mounted upon a stud 64 upon the frame bar below the driving shaft. The beveled face of this gear 63 meshes with a beveled gear 65 on the upper end of a vertical shaft 66 which is mounted in a projection 67 on the gear case and upon the lower end of said shaft 66 is a beveled gear 68 which meshes with a beveled gear 69 upon the feeding rod or bar 22. It will be noted that the gear 68 is at the inner side of the gear 69 so that it resists inward movement of the gear 69 and, consequently, aids in preventing inward endwise movement of the feeding bar 22. The outer end of the said feeding bar or rod is shown as equipped with a crank handle 70.

At its inner end, each arm 33 is provided with a lug 71 having a seat or socket 72 to receive one terminal 73 of a clamp bar 74 or the end of a screw 75 mounted in the terminal 76 of said bar.

The operation of the machine will, it is thought, be readily understood. While the machine is being brought into working position, the arms 33 are disposed in positions relatively remote from the cylinder or main body 19 so that they will clear the flange at the outer end of the journal. The centering pin 16 is engaged in the center of the journal upon which work is to be done and the pin 13 is then engaged with the remote journal, as previously set forth. The adjusting screws 36 are then manipulated so that the cutter 140 and roller 141 will be brought to bear upon the journal adjacent the flange thereon, after which power is applied to the driving shaft 57. The motion of the driving shaft 57 will be transmitted to the traveler 29 to rotate the same through the gears 56 and 54 and will also be transmitted through the train of gearing hereinbefore described to the feeding bar or rod 22 to effect rotation of said bar. The rotation of the traveler will, of course, carry the arm 33 around the cylinder 19 concentric therewith and the cutter 140 and the roller 141 will be caused to travel likewise around the journal 14, the cutter removing any projecting portions of the surface of the journal so that it will be reduced to a true cylinder, and the roller serving as a support for the journal to prevent its bending under the force exerted thereon by the cutter and also serving to compress any splinters or other slight imperfections left upon the surface by the cutter. The rotation of the feeding bar 22 will act upon the nut 24 so that it will be caused to travel longitudinally of the feeding bar or rod and the engagement of the finger 25 with the traveler will, of course, impart longitudinal or endwise motion to the traveler so that the cutter and the roller will be fed from the outer end of the journal toward the inner end thereof. When the tools have traveled the entire length of the journal, the power is shut off from the driving shaft 57 and the crank 70 is rotated to reverse the movement of the feed bar so that the feeding nut 24 will be brought quickly to the front end of the slot 26 and the tools returned to the initial position. It will be noticed that the stud 64 carrying the gear 63 is longer than the thickness of the gear. When a reverse rotation is imparted to the feeding bar, the gear 63 may be shifted out of engagement with the beveled gear 65 so that the motion of the feeding bar will not be transmitted to the driving shaft. If a single operation of the tools does not sufficiently reduce the journal but leaves its surface still irregular, the cutter may be adjusted through the stem 43 so as to further reduce the journal if it be again caused to travel thereover and if it be necessary to substitute a roller 141 having a greater diameter, the substitution can be quickly made by manipulation of the retaining washer and nut.

When the journal has been sufficiently reduced by the cutter, the cutter is removed and a roller 77, similar in all respects to the roller 141, is substituted therefor. The clamp bar 74 is then brought into position, as shown in Fig. 8, and pressure applied through the screw 75 to cause the two rollers to bear with considerable force upon the journal. Power is then applied to the driving shaft 57, as before, and the rollers will be thereby moved around and along the journal, polishing the same and making its surface smooth and even throughout.

It will be readily noted that I have provided a very compact and simply constructed machine which may be easily operated and which will prove efficient in use. The machine is sufficiently heavy to withstand the strain to which it is subjected while in operation but is not so heavy that it cannot be easily handled by two men.

Having thus described the invention, what is claimed as new is:

1. A portable machine for truing journals at the ends of a car axle comprising a frame bar adapted to span the car axle, centering pins carried by the ends of said frame bar to engage the centers of the car journals, a traveling support for one end of the frame bar, and tools carried by last-mentioned end of said frame bar to travel around and longitudinally of the journal to be trued.

2. In a machine for truing car journals, the combination of a relatively stationary body, external tool-carrying arms supported for rocking movement upon said body, whereby to clear the flange at the end of the journal, means acting on said arms at opposite sides of the pivot thereof to adjust the arms and hold them in set positions, tools carried by the inner ends of said arms, and means for moving said arms around the body and longitudinally of the same with the tool in contact with the journal.

3. In a machine for truing car journals, a supporting structure adapted to span a car axle, centering devices in the supporting structure to engage the ends of the car axle, tool-carrying arms mounted upon the supporting structure for rocking movement whereby to clear the flange at the end of the car axle, tools carried by said arms, and means acting on said arms whereby to move the tools along and around the car axle in contact therewith.

4. In a machine for truing car journals, the combination of a support, a traveler mounted upon said support, tool-carrying arms pivotally mounted upon the traveler intermediate their ends, reversely threaded adjusting screws mounted in the traveler transversely of the tool-carrying arms at opposite sides of the pivots for the respective arms, and reversely arranged wedges having threaded engagement with said adjusting screws and having sliding engagement with the respectively adjacent tool-carrying arms.

5. In a machine for truing car journals, the combination of a support, a traveler mounted loosely upon the support, the support being provided with a longitudinal slot over which the traveler passes and the traveler being provided with an annular internal recess, tool-carrying arms mounted upon the traveler and extending beyond the support, means for rotating the traveler, a threaded feed bar disposed longitudinally within the support, means for rotating said feed bar simultaneously with the rotation of the traveler, a nut fitted upon said threaded feed bar, and a finger extending from said nut and engaging the annular recess in the traveler.

6. In a machine for truing car journals, the combination of a support, a traveler mounted loosely upon the support, tool-carrying arms mounted upon the traveler and projecting beyond the support, a gear fixed to said traveler, a driving shaft, a gear fitted upon said driving shaft to rotate therewith but free to move longitudinally thereon, said gear being provided with circumferential flanges engaging the opposite faces of the gear on the traveler, and means for effecting endwise movement of the traveler.

7. In a machine for truing car journals, the combination of a support, tool-carrying arms mounted upon the support, said arms being provided at their inner ends with sockets, stems engaged in said sockets, keys inserted transversely through the arms and said stems, tools carried by the said stems at the ends of the arms, means for securing the tools in a set position, and means acting on the tool-carrying arms to effect travel of the tools around and along the journal to be trued.

8. In a machine for truing car journals, the combination of a frame bar having a depending end, a portable support connected with said depending end of the frame bar, a cylinder fitted through the depending end of the frame bar and provided with a flange bearing against the inner face of the frame bar, a nut mounted upon the outer end of the cylinder and bearing against the outer face of the frame bar, a traveler mounted upon the cylinder, a feed bar disposed longitudinally in the cylinder, means mounted upon the said feed bar and engaging the traveler whereby rotation of the feed bar will effect endwise movement of the traveler, tool-carrying arms mounted on the traveler, and means for rotating the traveler.

9. In a machine for truing car journals, the combination of an arched frame bar, a cylinder in the end of said frame bar, a traveler mounted upon the cylinder, tool-carrying arms mounted upon the traveler, a hanger on the frame bar, a driving shaft mounted in the frame bar and said hanger above the cylinder, a feed bar mounted within the cylinder, means mounted upon said feed bar and engaging the traveler to effect endwise movement of the traveler upon rotation of the feed bar, means driven by the driving shaft to rotate the feed bar, and operative connection between the driving shaft and the traveler whereby to rotate the traveler.

10. In a machine for truing car journals, the combination of a support, a traveler mounted on the support, tool-carrying arms pivotally mounted on the traveler intermediate their ends, and means mounted on the traveler at opposite sides of the pivots of said arms to effect pivotal movement of the arms and hold them in adjusted positions, said means being all operable from one side of the support.

11. In a machine for truing car journals, the combination of a support, a traveler mounted upon the support, means for rotating the traveler about the support, a feed bar disposed longitudinally within the support, means mounted upon the feed bar and projecting through the support to engage the traveler whereby rotation of the feed bar will effect endwise movement of the traveler, and tool-carrying arms mounted on the traveler.

In testimony whereof I affix my signature.

THOMAS J. HADDEN. [L. S.]